(12) United States Patent
Rekhate et al.

(10) Patent No.: US 11,507,653 B2
(45) Date of Patent: Nov. 22, 2022

(54) COMPUTER WHITELIST UPDATE SERVICE

(71) Applicant: VMWARE, INC., Palo Alto, CA (US)

(72) Inventors: Vaibhav Rekhate, Pune (IN); Nilesh Awate, Pune (IN); Amit Vasant Patil, Pune (IN); Vijay Ganti, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 368 days.

(21) Appl. No.: 16/233,143

(22) Filed: Dec. 27, 2018

(65) Prior Publication Data
US 2020/0065478 A1 Feb. 27, 2020

(30) Foreign Application Priority Data
Aug. 21, 2018 (IN) .............................. 201841031276

(51) Int. Cl.
*G06F 21/53* (2013.01)
*G06F 21/51* (2013.01)
*G06F 21/55* (2013.01)
*G06F 21/56* (2013.01)
*G06F 9/455* (2018.01)

(52) U.S. Cl.
CPC .......... *G06F 21/53* (2013.01); *G06F 9/45558* (2013.01); *G06F 21/51* (2013.01); *G06F 21/552* (2013.01); *G06F 21/554* (2013.01); *G06F 21/566* (2013.01); *G06F 2009/45587* (2013.01); *G06F 2221/033* (2013.01)

(58) Field of Classification Search
CPC ........ G06F 21/53; G06F 21/51; G06F 21/566; G06F 9/45558; G06F 2009/45587

USPC .......................................................... 726/26
See application file for complete search history.

(56) References Cited

U.S. PATENT DOCUMENTS

| | | | |
|---|---|---|---|
| 8,225,317 B1 * | 7/2012 | Chiueh .................... | G06F 9/455 718/1 |
| 8,863,232 B1 * | 10/2014 | Tidd ..................... | G06F 21/6218 726/2 |
| 8,910,155 B1 * | 12/2014 | Sobel ...................... | G06F 9/445 718/1 |
| 9,112,854 B1 * | 8/2015 | Bhimanaik ......... | H04L 63/0823 |
| 9,742,796 B1 * | 8/2017 | Salsamendi ........... | G06F 21/562 |
| 9,819,663 B1 * | 11/2017 | Gauda ................. | G06F 16/1734 |
| 9,832,256 B1 * | 11/2017 | Anantharaju ......... | G06F 9/4451 |
| 10,778,724 B1 * | 9/2020 | Miriyala .............. | H04L 63/0263 |
| 10,831,522 B1 * | 11/2020 | Ozerkov ............. | G06F 9/45558 |
| 10,846,117 B1 * | 11/2020 | Steinberg ................ | G06F 21/56 |

(Continued)

*Primary Examiner* — Venkat Perungavoor
*Assistant Examiner* — Peiliang Pan

(57) ABSTRACT

A management service can be used to manage enterprise applications. Management agents can be installed in each enterprise application, e.g., in each virtual machine of each enterprise application. The management agent can check each process created by its host virtual machine against a local whitelist. If the local whitelist indicates the process is safe, the process can be executed. Otherwise, an alert including a process description is sent to the management service. An alert analyzer of t he management service can check information of the management service itself as well as third-party information to determine whether or not the process is safe. In the event the alert analyzer determines a process that was the subject of an alert is, in fact, safe, an indication that the process is safe is added to the local whitelist.

4 Claims, 2 Drawing Sheets

(56) References Cited

U.S. PATENT DOCUMENTS

| | | | |
|---|---|---|---|
| 2008/0134176 A1* | 6/2008 | Fitzgerald | G06F 11/0751 718/1 |
| 2008/0244577 A1* | 10/2008 | Le | G06F 9/45558 718/1 |
| 2009/0019517 A1* | 1/2009 | Turakhia | G06F 21/6218 726/1 |
| 2009/0254990 A1* | 10/2009 | McGee | G06F 21/50 726/22 |
| 2010/0161972 A1* | 6/2010 | Staring | H04L 9/0836 713/158 |
| 2010/0325727 A1* | 12/2010 | Neystadt | G06F 21/53 726/22 |
| 2012/0159570 A1* | 6/2012 | Reierson | G06F 21/74 726/2 |
| 2013/0132691 A1* | 5/2013 | Banga | G06F 9/4406 711/162 |
| 2013/0177156 A1* | 7/2013 | Ryan | H04L 9/08 380/277 |
| 2013/0191924 A1* | 7/2013 | Tedesco | G06F 21/00 726/26 |
| 2013/0326505 A1* | 12/2013 | Shah | G06F 8/61 718/1 |
| 2014/0122700 A1* | 5/2014 | Jung | G06F 21/6254 709/224 |
| 2015/0040246 A1* | 2/2015 | Yuen | H04W 12/10 726/30 |
| 2015/0220455 A1* | 8/2015 | Chen | G06F 21/64 711/163 |
| 2015/0339475 A1* | 11/2015 | Feroz | G06F 21/53 726/23 |
| 2016/0094650 A1* | 3/2016 | Garcia de Rio | G06F 9/46 709/226 |
| 2016/0188873 A1* | 6/2016 | Smith | H04L 9/3247 726/22 |
| 2016/0366142 A1* | 12/2016 | Kamble | G06F 16/2255 |
| 2017/0006053 A1* | 1/2017 | Greenberg | H04L 67/10 |
| 2017/0093918 A1* | 3/2017 | Banerjee | H04L 63/20 |
| 2017/0250976 A1* | 8/2017 | Ramachandran | H04L 63/10 |
| 2017/0251013 A1* | 8/2017 | Kirti | H04L 63/1408 |
| 2017/0346843 A1* | 11/2017 | Zhang | G06F 21/44 |
| 2017/0374032 A1* | 12/2017 | Woolward | G06F 9/45558 |
| 2018/0089430 A1* | 3/2018 | Mayo | G06F 21/552 |
| 2018/0173526 A1* | 6/2018 | Prinsloo | G06F 8/61 |
| 2018/0359272 A1* | 12/2018 | Mizrachi | G06F 21/57 |
| 2019/0044946 A1* | 2/2019 | Hwang | G06F 16/172 |
| 2019/0068627 A1* | 2/2019 | Thampy | H04L 63/1425 |
| 2019/0197233 A1* | 6/2019 | Chopra | G06F 21/552 |
| 2019/0380020 A1* | 12/2019 | Pellegrini | H04W 4/021 |

* cited by examiner

COMPUTER WHITELIST UPDATE SERVICE

RELATED APPLICATIONS

Benefit is claimed under 35 U.S.C. 119(a)-(d) to Foreign Application Serial No. 201841031276 filed in India entitled "COMPUTER WHITELIST UPDATE SERVICE", on Aug. 21, 2018, by VMware, Inc., which is herein incorporated in its entirety by reference for all purposes.

BACKGROUND

Enterprise applications, such as retail websites, may suffer disruptions due to malfunctions and malicious attacks. Blacklists and whitelists are two approaches to avoiding such disruptions. Blacklists identify sources of disruption directly. A whitelist identifies normal behaviors; behaviors that due not match an item on a whitelist can be flagged as anomalies and potential sources of disruption. One advantage of a whitelist is that it can detect a first occurrence of a problem that a blacklist would have to be updated to detect.

DETAILED DESCRIPTION

The present invention provides for whitelist updating via a remote, e.g., cloud-based, management service. When process behavior is detected that does not match an item of a local whitelist, an alert is sent to a management service. The management service checks one or more sources of information to see if the process should be added to the local whitelist. These sources can include a global whitelist of the management service, which can include process characterization obtained from elsewhere in, the managed system, from other managed systems, and from third-party sources (e.g., Carbon Black). Also, information regarding process behaviors can be obtained from a system administrator or third-party sources. In the event the management service determines that the process should be allowed, the process is added to the whitelist.

This feedback loop between the virtual machines and the management service helps prevent the generation of alerts for known good processes and at the same time helps to keep local whitelists updated from the outside. The management service can also create groupings of machines which are known to exhibit similar behavior. The whitelist learnt from one system is applicable for other systems in the group. Because the whitelist can be updated from the outside, it can also be used to revoke any application without needing a list of blacklisted applications. Outdated applications and non-compliant applications can be simply disallowed by updating the local whitelists. Applications can also be added to a global whitelist which is at the organization level. This can help prevent alarms that might otherwise occur during a planned rollout of a new application in the organization.

Figure 1:
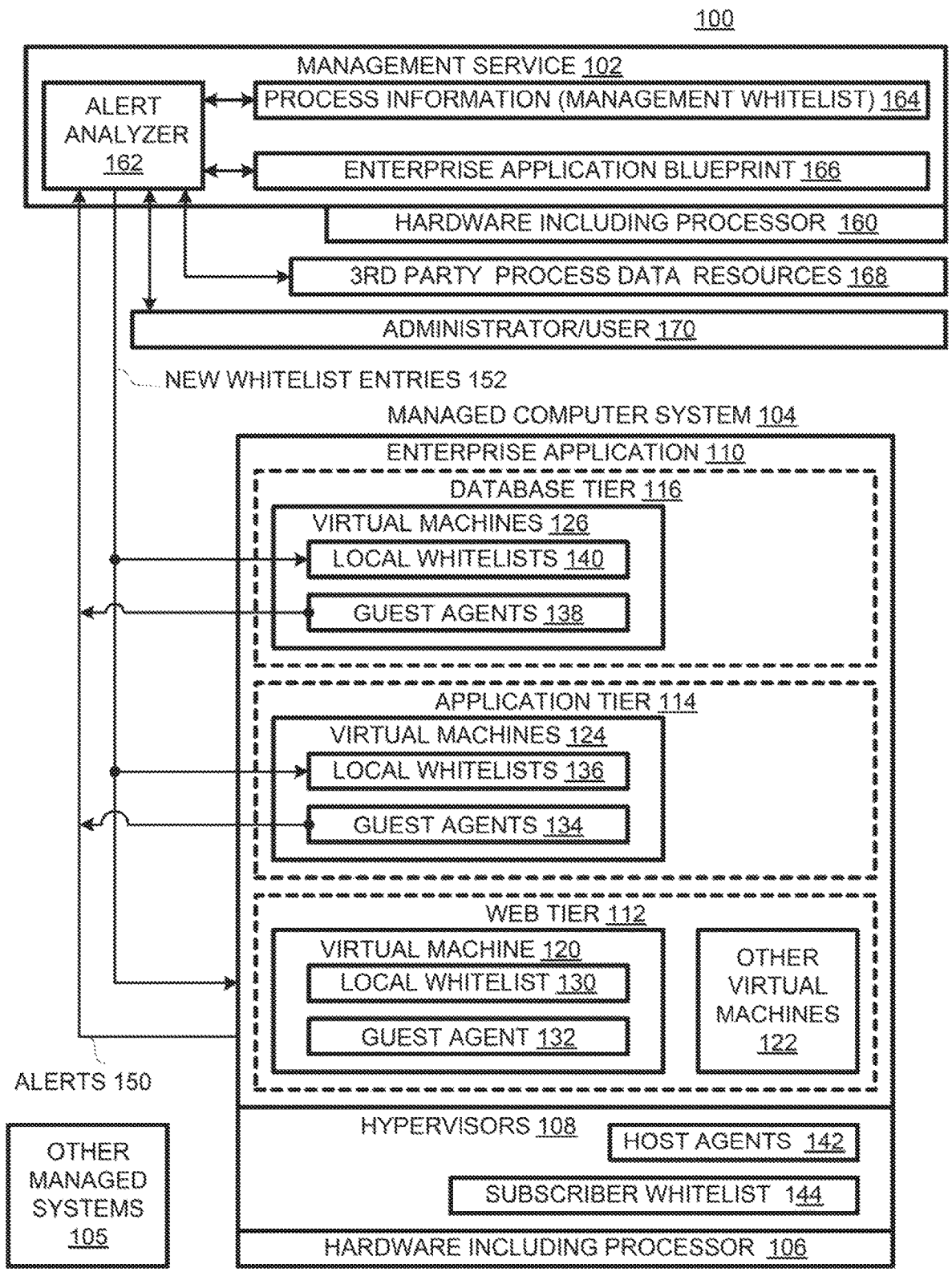
FIG. 1 is a schematic drawing of a computer management system.

As shown in FIG. 1, a computer-management system 100 includes a management service 102, a managed computer system 104, and other managed computer systems 105. Managed computer system 104 is an on-premises system in that the hardware 106 on which. it runs is located on premises of the owner of the managed computer system 104 and subscriber to management service 102. Managed computer system 104 includes hypervisors 108 for virtualizing hardware 106, An enterprise application 110 includes virtual machines that run on hypervisors 108. In other embodiments, the management service is not cloud-based and the managed computer system is not on-premises, but may itself be located "in the cloud", e.g., based on services such as Amazon Web Services, IBM's Azure, etc. Here, an "enterprise application" is an application constituted by software applications that cooperate to serve some mission or purpose of an entity that owns the enterprise application. For example, online retail websites tend to be enterprise applications.

Enterprise application 110 is a three-tier application, including a web tier 112, an application tier 114, and a database tier 116. Web tier 112 serves as an interface with customers and/or other users of the enterprise application 110. Web tier 112 typically provides for admissions control and session management, e.g., so that responses are properly matched to customer requests. Database tier 116 includes one or more databases; for example, an online retail application might include a product catalog database, an inventory database, and a customer information database. Application tier 114 may include software applications that convert customer requests to database queries and database responses to responses to be forwarded to the customers.

Each tier includes virtual machines. Web tier 112 includes a virtual machine 120 along with other virtual machines 122. Application tier 114 includes virtual machines 124, and database tier 116 includes virtual machines 126.

Virtual machine 120 of web tier 112 includes, along with software providing the web-interface functionality, a local whitelist 130 of allowable or "safe" processes. A driver for virtual machine 120 allows safe processes to execute and halts execution of other processes. Virtual machine 120 also includes a guest agent 132 for management services 102. Each of the other virtual machines 122 of web tier 112 includes its own guest agent and associated local whitelist. Likewise, each of virtual machines 124 on application tier 114 includes a respective guest agent 134 and a respective local whitelist 136. Similarly, each of virtual machines 126 of database tier 116 includes a respective guest agent 138 and a local whitelist 140. Depending on the embodiment, the different virtual machines of a tier may run different software applications or different instances of the same software application (or both).

In the illustrated embodiment, virtual machines 120, 122, 124, and 126, are hosted on a plural of hardware systems and associated hypervisors 108. Each hypervisor includes a host agent 142 and the hyper visors share a global whitelist 144. An alternative embodiment does not include host agents or a global whitelist.

Guest agent 132 is an agent of management service 102. Guest agent 132 collects data on processes of its host virtual machine 120. The collected data specifies values for parameters such as process commands and arguments, full path name, a cryptographic hash of the process, etc. In the event a process is not on the local whitelist, the process is not executed. The guest agent is informed of the disallowance and issues an "unsafe-process" alert 150, including the collected data, to management service 102.

Management service 102 includes hardware 160 including a processor, communications devices, and non-transitory media. The media is encoded with code defining an alert analyzer 162, a process data store 164, and a blueprint 166 for enterprise application 110.

An unsafe process alert 150 received by management service 102 is handled by alert analyzer 162. Alert analyzer 162 checks the process information 164, which serves as a management whitelist, for a match for the process associated with the alert. Process information 164 records determinations regarding previous alerts, including alerts issued by management agents in other host virtual machines. In the event a match is found in the process information, the process may he considered safe, at least provisionally.

If there is no match in the process information 164, third-party sources 168 may he checked for information leading to a determination regarding the subject process, in the event third-party information indicates that the process should be allowed, the process can be added (as indicated at 152) to local whitelist 130, subscriber whitelist 122, and process information 164. In the event the third-party information dictates that the process should not be allowed, this determination is also submitted to the process information, which also serves as a management blacklist.

Even though a process is allowable in one virtual machine, it may not be allowable on another. For example, if the virtual machines provide different services, a process allowed on one may not be appropriate on the other. Even if the virtual machines represent different instances of the same service, a behavior allowable on one virtual machine may not be allowable on the other. For example, one web service virtual machine may not be entitled to access a network interface that a virtual machine serving the same service is entitled to access. Accordingly, alert analyzer 162 can access blueprint 162 for the enterprise application to identify cases in which a process should be disallowed even though a match is found in the management whitelist 164.

If alert analyzer 162 cannot determine allowability from management whitelist 164 and third party sources 168, then the process description can be sent to an administrator 170 or other user of the enterprise application, e.g., for approval or corrective action. The results of the administrator's determination can be recorded in the aggregate whitelist.

Figure 2:
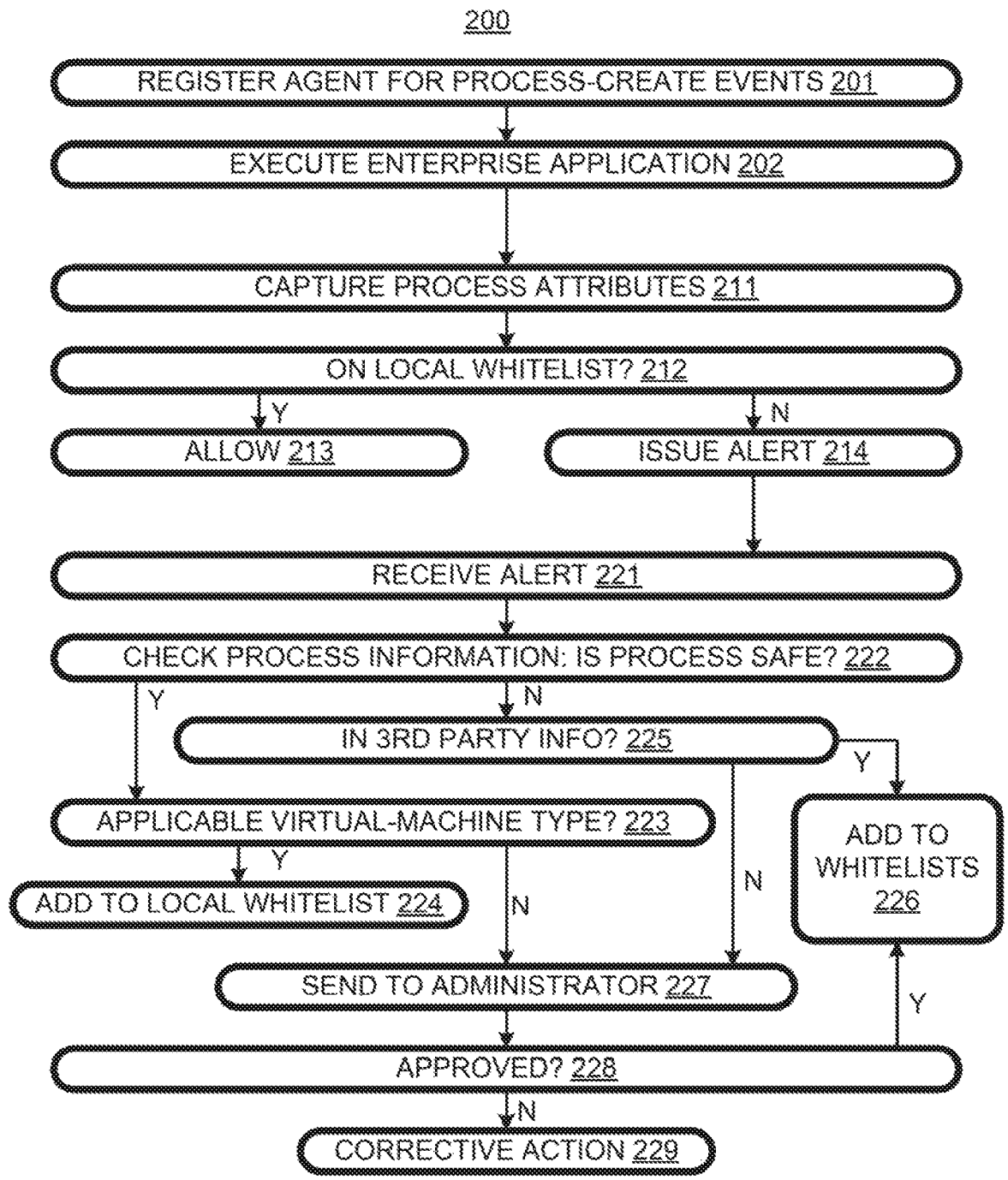
FIG. 2 is a flow chart of a whitelist process implementable in the system of FIG. 1 and in other systems.

A whitelist update process 200, flow-charted in FIG. 2, is implementable in management system 100 and in other systems. More specifically, process 200 can be initiated by any of the guest or host agents of the enterprise application. At 201, management agents are installed, e.g., in virtual machines and/or their hosts; the agents are registered for process-create events. At 202, the enterprise application is executed. In sonic embodiments, the initial execution is in a learning mode for populating the respective whitelists.

At 211, the agent captures process attributes such as path, command line info, cryptographic hash, etc. At 212 the agent checks the local whitelist. In the event the whitelist indicates the process is "safe", then, at 213, the process is allowed to execute. In the event that the process is not listed as "safe" in the whitelist, then the process is not allowed to execute. Instead, at 214, the agent issues an "unsafe-process" alert; this alert specifies the process attributes.

At 211, a local management agent hosted by a virtual machine captures data descriptive of a virtual-machine process. At 212, a check is made to determine whether or not the description of the behavior matches an item on a local whitelist for the management agent. At 213, in the event that the local whitelist indicates that the behavior should be allowed, then the process is allowed to proceed. At 214, in the event that the local white list indicates that the behavior appears to be anomalous, the management agent issues an alert to that effect. Depending on the embodiment, the alert may he sent directly from the guest agent or sent indirectly, via a respective host agent, to the management service.

At 221, the alert is received by an alert analyzer of the management service. At 222, the alert analyzer checks the information for the subject process. The process information can include publisher information with digital signature details. Based on such information, a determination is made whether or not the subject process is safe. In an event in which the process information indicates that the process is safe in general, then, at 223, a check may be performed, e.g., of an application blueprint, to ensure that the process is appropriate for the virtual machine to which the subject process belongs. In the event that the determination is that the process is safe in the context of the subject virtual machine, then, at 224, the process is added to the local whitelist.

In the event that, at 222, it is determined that the subject process is not indicated as safe by the process information, then at 225, third party information may be checked. in the event in which the third party information indicates that the process is safe, that process is added to the local, subscriber, and management whitelists at 226.

In the event that at 223 or 225, a determination that the safety of a process is unknown, then, at 227, the alert is sent to an administrator for the enterprise application. The administrator may approve or disallow the process at 228. In the event that the administrator approves, the process can be added to the whitelists at 226. Otherwise, the administrator can initiate corrective action at 229.

At 228, in the event that the administrator indicates that the process is unsafe, then indications to that effect can be added to the process information and even to a local blacklist. Also note, that at 222, in the event that the behavior is indicated as unsafe by the process information, no further action is required; at that point, process 200 can add the behavior to a local blacklist (if one exists) and stop.

Herein, art labeled "prior art", if any, is admitted prior art; art not labelled "prior art", if any, is not admitted prior art. The illustrated embodiments, variations thereupon, and modifications thereto, are provided for by the present invention, the scope of which is defined by the following claims.

What we claim is:

1. A process comprising:
   executing an application, said application comprising a driver for a first virtual machine;
   collecting, by a first management agent of a management service and installed in the application, process data regarding a first instance of a first process created by executing the application, said first management agent comprising a guest agent of said first virtual machine;
   determining, by the first management agent, whether or not the first process is indicated as safe by referring to a first local whitelist;
   in an event in which the first local whitelist does not indicate that the first process is safe, sending an alert including the process data to an alert analyzer of the management service, the alert analyzer being separate from the application;
   in an event in which the alert analyzer determines that the first process is safe, adding an indication to the first local whitelist that indicates that the first process is safe;
   while the first local whitelist indicates that the first process is safe, allowing a second instance of the first process to execute based on that indication in the first local whitelist;
   wherein the application includes plural virtual machines including said first virtual machine, each virtual machine including a respective management agent and having a respective local whitelist, the first virtual machine having the first management agent and the first local whitelist;

wherein the plural virtual machines include a second virtual machine, the second virtual machine including a second management agent and a second local whitelist, such that, in the event a third process instance of the first process is not indicated as safe by the second local whitelist, the second management agent issues an alert to the alert analyzer;

determining that a management whitelist of the management service and external to the application does not indicate that the first process is safe;

determining that a third-party source indicates that the first process is safe;

adding a first-process-safe indication to the management whitelist that the first process is safe;

determining that the first process is safe based on the first-process-safe indication added to the management whitelist;

adding a first-process-safe indication to the second local whitelist;

allowing a fourth instance of the first process to run in the second virtual machine based on the first-process-safe indication in the second local whitelist, wherein said first local whitelist and said second local whitelist are able to revoke any unsafe application without needing a list of blacklisted applications; and said plural virtual machines residing on a web tier, each of said plural virtual machines of said web tier configured to run different software applications or different instances of a same software application.

2. The process of claim 1 further comprising: in the event that the alert analyzer cannot determine whether or not the first process is safe, forwarding the alert to an administrator of the application.

3. A system comprising non-transitory media encoded with code that when executed by a processor implements a process including:

executing an application, said application comprising a driver for a first virtual machine;

collecting, by a first management agent of a management service and installed in the application, process data regarding a first instance of a first process created by executing the application, said first management agent comprising a guest agent of said first virtual machine;

determining, by the first management agent, whether or not the first process is indicated as safe by referring to a first local whitelist;

in an event in which the first local whitelist does not indicate that the first process is safe, sending an alert including the process data to an alert analyzer of the management service, the alert analyzer being separate from the application;

in an event in which the alert analyzer determines that the first process is safe, adding an indication to the first local whitelist that indicates that the first process is safe;

while the first local whitelist indicates that the first process is safe, allowing a second instance of the first process to execute based on that indication in the first local whitelist;

wherein the application includes plural virtual machines including said first virtual machine, each virtual machine including a respective management agent and having a respective local whitelist, the first virtual machine having the first management agent and the first local whitelist;

wherein the plural virtual machines include a second virtual machine, the second virtual machine including a second management agent and a second local whitelist, such that, in the event a third process instance of the first process is not indicated as safe by the second local whitelist, the second management agent issues an alert to the alert analyzer;

determining that a management whitelist of the management service and external to the application does not indicate that the first process is safe;

determining that a third-party source indicates that the first process is safe;

adding a first-process-safe indication to the management whitelist that the first process is safe;

determining that the first process is safe based on the first-process-safe indication added to the management whitelist;

adding a first-process-safe indication to the second local whitelist;

allowing a fourth instance of the first process to run in the second virtual machine based on the first-process-safe indication in the second local whitelist, wherein said first local whitelist and said second local whitelist are able to revoke any unsafe application without needing a list of blacklisted applications; and said plural virtual machines residing on a web tier, each of said plural virtual machines of said web tier configured to run different software applications or different instances of a same software application.

4. The system of claim 3 wherein the process further includes: in the event that the alert analyzer cannot determine whether or not the first process is safe, forwarding the alert to an administrator of the application.

* * * * *